US011920657B2

(12) United States Patent
Kang et al.

(10) Patent No.: US 11,920,657 B2
(45) Date of Patent: Mar. 5, 2024

(54) CYCLOIDAL SPEED REDUCER

(71) Applicant: MINTROBOT CO., LTD., Daejeon (KR)

(72) Inventors: Hyeong Seok Kang, Seoul (KR); Soon Bin Hong, Paju-si (KR)

(73) Assignee: MINTROBOT CO., LTD., Daejeon (KR)

( * ) Notice: Subject to any disclaimer, the term of this patent is extended or adjusted under 35 U.S.C. 154(b) by 0 days.

(21) Appl. No.: 17/897,105

(22) Filed: Aug. 26, 2022

(65) Prior Publication Data

US 2022/0403918 A1 Dec. 22, 2022

Related U.S. Application Data

(63) Continuation of application No. PCT/KR2020/016124, filed on Nov. 17, 2020.

(30) Foreign Application Priority Data

Sep. 28, 2020 (KR) .......................... 10-2020-0126218

(51) Int. Cl.
*F16H 1/32* (2006.01)
*F16H 55/10* (2006.01)
*F16H 57/021* (2012.01)

(52) U.S. Cl.
CPC .............. *F16H 1/32* (2013.01); *F16H 55/10* (2013.01); *F16H 57/021* (2013.01); *F16H 2001/325* (2013.01); *F16H 2001/327* (2013.01)

(58) Field of Classification Search
CPC ...... F16H 1/32; F16H 55/10; F16H 2001/323; F16H 2001/325; F16H 2001/327

(Continued)

(56) References Cited

U.S. PATENT DOCUMENTS 2,170,951 A * 8/1939 Perry .................. F16H 1/32
475/159
2,750,807 A * 6/1956 Miyazaki .............. F16H 55/10
74/457

(Continued)

FOREIGN PATENT DOCUMENTS

DE  2835973 A1 * 5/2023
JP  63214541 A * 9/1988

(Continued)

OTHER PUBLICATIONS

Non-final office action dated Dec. 2, 2020 from the Korean Patent Office for Korean Application No. 10-2020-0126218.

(Continued)

*Primary Examiner* — Sherry L Estremsky
(74) *Attorney, Agent, or Firm* — Insight Law Group, PLLC; Seung Lee

(57) ABSTRACT

A cycloidal reducer includes a reduction unit configured to reduce a torque input and an output unit configured to transfer the reduced output to the outside. A cycloidal rotor that is one constituent element of the reduction unit has a tooth-type protrusion formed in the shape of a circular arc. Thus, the level of difficulty of process is decreased more than when the tooth-type protrusion in the related art is formed in the shape of a broken line. In addition, rotor pins are accommodated in through-holes, respectively, that are equally spaced in the cycloidal rotor. A bushing is formed that fills a gap between the through-hole and the rotor pin is formed in order for the rotor pin to stably transfer rotational power. Accordingly, the advantage of effectively distributing a load and stably transferring a reduction torque to the outside is provided.

17 Claims, 14 Drawing Sheets

(58) Field of Classification Search
USPC .......................................................... 475/168
See application file for complete search history.

(56) References Cited

U.S. PATENT DOCUMENTS

| | | | | | |
|---|---|---|---|---|---|
| 2,783,662 | A | * | 3/1957 | Schneider | F16H 1/32 475/168 |
| 3,192,799 | A | * | 7/1965 | Pamplin | F16H 1/32 74/411 |
| 4,117,746 | A | * | 10/1978 | Pierrat | F16H 1/32 475/180 |
| 4,297,920 | A | * | 11/1981 | Richter | B25J 9/103 74/390 |
| 4,471,672 | A | * | 9/1984 | Butterfield | F16H 1/32 475/168 |
| 4,898,065 | A | * | 2/1990 | Ogata | F16H 1/32 475/179 |
| 5,695,425 | A | * | 12/1997 | Hashimoto | F16H 1/32 74/462 |
| 6,450,913 | B1 | * | 9/2002 | Strowik | B60N 2/0224 475/179 |
| 7,147,582 | B2 | * | 12/2006 | Mingishi | F16H 1/32 475/171 |
| 2018/0291996 | A1 | * | 10/2018 | Fan | F16H 55/17 |
| 2019/0264780 | A1 | * | 8/2019 | Tamura | F16H 1/32 |

FOREIGN PATENT DOCUMENTS

| | | | |
|---|---|---|---|
| JP | 07-117128 | B2 | 12/1995 |
| JP | 2015-102216 | A | 6/2015 |
| KR | 10-1515682 | B1 | 5/2015 |
| KR | 10-1901278 | B1 | 9/2018 |
| KR | 10-2054257 | B1 | 1/2020 |
| WO | WO-2007125800 | A1 * 11/2007 | ............... F16H 1/32 |

OTHER PUBLICATIONS

Notice of allowance dated Apr. 29, 2021 from the Korean Patent Office for Korean Application No. 10-2020-0126218.
International Search Report dated Jun. 18, 2021 for International Application No. PCT/KR2020/016124 and its English translation.

* cited by examiner

CYCLOIDAL SPEED REDUCER

CROSS-REFERENCE TO RELATED APPLICATIONS

This application is a continuation application of International Application No. PCT/KR2020/016124, filed Nov. 17, 2020, which claims the benefit of Korean Patent Application No. 10-2020-0126218, filed Sep. 28, 2020 in the Korean Intellectual Property Office, the disclosures of which are incorporated herein in their entirety by reference.

TECHNICAL FIELD

The present disclosure relates to a cycloidal reducer.

BACKGROUND ART

Industrial robots employ a joint structure in which a multiplicity of joints have the freedom of motion. The motion is provided to a joint through an actuator motor, a servo motor, and the like. In a usual configuration of a robot joint, a reducer is installed on an output terminal of a servo motor to obtain a high-output torque from the servo motor or the like.

The industrial robots employ a harmonic drive technique or a cycloidal drive technique in order to fully or partially decrease robot motion. Of these, the cycloidal drive technique is used in various ways in various industrial fields. In a structure to which the cycloidal drive technique is applied, a cycloidal disc is rotated with external teeth thereof being engaged with internal teeth of an output shaft. Accordingly, rotational power of an input shaft is reduced, and thus the reduced rotational power is transferred to the output shaft. Through this structure, a great torque is made transferable, and a configuration where a reduction ratio is increased can be employed.

Usually, a cycloidal reducer is configured in such a manner that two or more cycloidal discs are formed at opposite positions and that a load is not concentrated to one side. In addition, the cycloidal disc is designed in such a manner that a difference between the number of external teeth of the cycloidal disc and the number of internal teeth of a housing accommodating the cycloidal disc is 1. Thus, a configuration where the cycloidal disc as a whole comes into contact with the housing is employed.

In order to manufacture the external teeth of the cycloidal disc, a skilled technician has to produce a shape of a tooth. Furthermore, there is a disadvantage in that, in order to manufacture the external teeth of the cycloidal disc, high-priced equipment and much manpower, time and cost are necessary.

SUMMARY OF INVENTION

Technical Problem

An object of the present disclosure, which is made to solve the above-mentioned problem, is to provide a cycloidal reducer in which a tooth-type protrusion corresponding to external teeth of a cycloidal rotor is formed by recessing in the shape of a circular arc, thereby improving machinability.

Another object of the present disclosure is to provide a cycloidal reducer that includes a bushing formed to fill a gap between a through-hole in a cycloidal rotor and a rotor pin in order to prevent a load from being concentrated in one direction due to rotation of the cycloidal rotor, thereby effectively distributing the load occurring between movements.

The present disclosure is not limited to the above-mentioned objects, and, from the following description, an object not mentioned above would be definitely understandable to a person of ordinary skill in the art.

Solution to Problem

In order to solve the above-mentioned objects, according to an aspect of the present disclosure, there is provided a cycloidal reducer including: a reduction unit configured to reduce an input torque; and an output unit configured to be supplied with a preset reduction torque through the reduction unit and to transfer an output torque to the outside, wherein the reduction unit includes: an input shaft configured to be supplied with the input torque; a cycloidal rotor arranged on an outer circumferential surface of the input shaft in an eccentrically rotatable manner, a plurality of through-holes being formed in a lateral surface of the cycloidal rotor in such a manner as to be arranged to be equally spaced along a circumferential direction thereof, and tooth-type protrusions being formed in the lateral surface thereof along a circumference of an edge thereof; a hollow housing configured to accommodate the cycloidal rotor and including a plurality of inner pins that are arranged along a circumference of an inner circumferential surface thereof in such a manner as to possibly come into contact with the tooth-type protrusions, respectively, of the cycloidal rotor; and a plurality of rotor pins arranged within the plurality of through-holes, respectively, in the cycloidal rotor arranged in an axial line direction of the input shaft, wherein the tooth-type protrusions of the cycloidal rotor are formed in such a manner as to be equally spaced along the circumference of the edge of the cycloidal rotor, and wherein each of the tooth-type protrusions includes: a recess portion in the shape of a circular arc that has a first radius of curvature and is engaged with each of the plurality of inner pins; and a protrusion portion having at least one radius of curvature different from the first radius of curvature and formed in such a manner as to protrude between the recess portions.

In the cycloidal reducer, the recess portion may have a circumferential length that is smaller than a circumferential length of a semicircle having the first radius of curvature, the inner pin of the housing may be formed in the shape of a circle in such a manner that an outer circumferential surface thereof has a fourth radius of curvature that is the same as the first radius of curvature or is smaller than the first radius of curvature, and a plurality of inner pin fixation grooves within which the plurality of inner pins, respectively, are fixed, may be formed in an inner circumferential surface of the housing, and each of the plurality of inner pin fixation grooves may have a circumferential length that is greater than or the same as a circumferential length of a semicircle having the fourth radius of curvature.

In the cycloidal reducer, the recess portion to be engaged with the inner pin may be formed at a position where, when the recess portion is engaged with the inner pin, the center of the recess portion is spaced a distance away from the center of the cycloidal rotor with the center of the inner pin in between.

In the cycloidal reducer, the protrusion portion may include: a central protrusion portion formed on the center of the protrusion portion and having a second radius of curvature; and a lateral-surface protrusion portion formed symmetrically about the central protrusion portion and having a third radius of curvature different from the second radius of curvature.

In the cycloidal reducer, a difference in the number of teeth, which is a difference between the number of the recess portions and the number of the inner pins, may be 2 or greater.

In the cycloidal reducer, the reduction unit may further include a bushing arranged between the through-hole and the rotor pin and configured to fill a gap between the through-hole and the rotor pin and thus to be rotated together with the rotor pin when the rotor pin is rotated.

In the cycloidal reducer, the reduction unit may further include a friction reduction means which is formed in such a manner as to be inserted into the through-hole in the cycloidal rotor, of which an outer circumferential surface comes into contact with an inner circumferential surface of the through-hole, and of which an inner circumferential surface comes into contact with an outer circumferential surface of the rotor pin.

In the cycloidal reducer, the friction reduction means may include: a first ring portion configured to come into contact with the inner circumferential surface of the through-hole and being concentric with the through-hole; a second ring portion formed in such a manner as to be concentric with the first ring portion while having a smaller diameter than the first ring portion, the inner circumferential surface thereof forming a bearing hole; and a bearing formed between the first ring portion and the second ring portion and rotated in such a manner that the first ring portion and the second ring portion are rotated relatively to each other, and a diameter of the rotor pin may be equal to or greater than one tenth of an inner diameter of the bearing hole and may be equal to and smaller than half of the inner diameter thereof.

In the cycloidal reducer, the bushing may include an opening portion formed at a position on the busing that is eccentric with respect to the center thereof, in a manner that passes therethrough, and the rotor pin may be rotatably inserted into the opening portion of the bushing.

In the cycloidal reducer, the busing may be formed of an elastic material and may have the same strength as or a lower strength than the rotor pin.

In the cycloidal reducer, the output unit may include: a first annular plate in the shape of a ring that has a preset inner diameter; a second annular plate in the shape of a ring that is formed in such a manner as to be concentric with the first annular plate and has an outer diameter different from the inner diameter; and a bearing to the side of the output unit that is arranged between the first annular plate and the second annular plate and is rotated in such a manner that the first annular plate and the second annular plate are moved relatively to each other.

In the cycloidal reducer, a plurality of rotor pin accommodation portions may be formed in a lateral surface of the second annular plate in such a manner as to be equally spaced, in a circumferential direction of the second annular plate, and first end portions of the plurality of rotor pins may be coupled to the rotor pin accommodation portions, respectively, in a manner that is impossible to rotate.

In the cycloidal reducer, the first annular plate may be formed in such a manner that an outer diameter thereof is smaller than an inner diameter of the housing, and the output unit may be inserted into an inner circumferential surface of the housing.

In the cycloidal reducer, the output unit may include: a first output unit coupled to one surface of the cycloidal rotor and configured to accommodate first end portions of the plurality of rotor pins; and a second output unit coupled to the other surface of the cycloidal rotor and configured to accommodate second end portions of the plurality of rotor pins that are formed in a direction opposite to the first end portions thereof, the first output unit may include: a first annular plate in the shape of a ring that has a preset inner diameter; a second annular plate in the shape of a ring that is formed in such a manner as to be concentric with the first annular plate and has an outer diameter different from the inner diameter; and a bearing to the side of the first output unit that is arranged between the first annular plate and the second annular plate and is rotated in such a manner that the first annular plate and the second annular plate are moved relatively to each other, and the second output unit may include: a third annular plate in the shape of a ring that has a preset inner diameter; a fourth annular plate in the shape of a ring that is formed in such a manner as to be concentric with the third annular plate and has an outer diameter different from the inner diameter; and a bearing to the side of the second output unit that is arranged between the third annular plate and the fourth annular plate and is rotated in such a manner that the third annular plate and the fourth annular plate are moved relatively to each other.

In the cycloidal reducer, the reduction unit may further include: a rotor-to-output-unit connection member including a separation annular plate that has a separation rotor pin accommodation portion on one surface thereof which is formed at a position corresponding to the rotor pin and into which the rotor pin is inserted, and a separation protrusion portion formed on the center of the other surface of the separation annular plate in a manner that protrudes therefrom, and coupled to the output unit, and the rotor-to-output-unit connection member may be fastened to at least one of the first annular plate and the second annular plate.

In the cycloidal reducer, the inner pin may be formed of an elastic material, and the inner pin may be formed in a manner that has a space inside.

According to another aspect of the present disclosure, there is provided a cycloidal reducer including: a reduction unit configured to reduce an input torque; and an output unit configured to be supplied with a preset reduction torque through the reduction unit and transferring an output torque to the outside, wherein the reduction unit comprises: an input shaft configured to be supplied with the input torque; a cycloidal rotor arranged on an outer circumferential surface of the input shaft in an eccentrically rotatable manner, a plurality of through-holes being formed in a lateral surface of the cycloidal rotor in such a manner as to be arranged to be equally spaced along a circumferential direction thereof, and tooth-type protrusions being formed in the lateral surface thereof along a circumference of an edge thereof; a hollow housing configured to accommodate the cycloidal rotor and including a plurality of inner pins that are arranged along a circumference of an inner circumferential surface thereof in such a manner as to possibly come into contact with the tooth-type protrusions, respectively, of the cycloidal rotor; a plurality of rotor pins arranged within the plurality of through-holes, respectively, in the cycloidal rotor arranged in an axial line direction of the input shaft; and a bushing arranged between the through-hole and the rotor pin and configured to fill a gap between the through-hole and the rotor pin and thus to be rotated together with the rotor pin when the rotor pin is rotated.

In the cycloidal reducer, the bushing may include an opening portion formed at a position on the busing that is eccentric with respect to the center thereof, in a manner that passes therethrough, and the rotor pin may be rotatably inserted into the opening portion of the bushing.

In the cycloidal reducer, the busing may be formed of an elastic material and may have the same strength as or a lower strength than the rotor pin.

In the cycloidal reducer, the reduction unit may further include a friction reduction means which is formed in such a manner as to be inserted into the through-hole in the cycloidal rotor, of which an outer circumferential surface comes into contact with an inner circumferential surface of the through-hole, and of which an inner circumferential surface comes into contact with an outer circumferential surface of the rotor pin.

In the cycloidal reducer, the friction reduction means may include: a first ring portion configured to come into contact with the inner circumferential surface of the through-hole and being concentric with the through-hole; a second ring portion formed in such a manner as to be concentric with the first ring portion while having a smaller diameter than the first ring portion, the inner circumferential surface thereof forming a bearing hole; and a bearing formed between the first ring portion and the second ring portion and rotated in such a manner that the first ring portion and the second ring portion are rotated relatively to each other, wherein a diameter of the rotor pin may be equal to or greater than one tenth of an inner diameter of the bearing hole and may be equal to and smaller than half of the inner diameter thereof.

In the cycloidal reducer, the tooth-type protrusions of the cycloidal rotor may be formed in such a manner as to be equally spaced along the circumference of the edge of the cycloidal rotor, and each of the tooth-type protrusions may include: a recess portion in the shape of a circular arc that has a first radius of curvature and is engaged with each of the plurality of inner pins; and a protrusion portion having at least one radius of curvature different from the first radius of curvature and formed in such a manner as to protrude between the recess portions.

In the cycloidal reducer, the recess portion may have a circumferential length that is smaller than a circumferential length of a semicircle having the first radius of curvature, the inner pin of the housing may be formed in the shape of a circle in such a manner that an outer circumferential surface thereof has a fourth radius of curvature that is the same as the first radius of curvature or is smaller than the first radius of curvature, and a plurality of inner pin fixation grooves within which the plurality of inner pins, respectively, are fixed, may be formed in an inner circumferential surface of the housing, and each of the plurality of inner pin fixation grooves may have a circumferential length that is greater than or the same as a circumferential length of a semicircle having the fourth radius of curvature.

In the cycloidal reducer, the recess portion to be engaged with the inner pin may be formed at a position where, when the recess portion is engaged with the inner pin, the center of the recess portion is spaced a distance away from the center of the cycloidal rotor with the center of the inner pin in between.

In the cycloidal reducer, the protrusion portion may include: a central protrusion portion formed on the center of the protrusion portion and having a second radius of curvature; and a lateral-surface protrusion portion formed symmetrically about the central protrusion portion and having a third radius of curvature different from the second radius of curvature.

In the cycloidal reducer, a difference in the number of teeth, which is a difference between the number of the recess portions and the number of the inner pins, may be 2 or greater.

In the cycloidal reducer, the output unit may include: a first annular plate in the shape of a ring that has a preset inner diameter; a second annular plate in the shape of a ring that is formed in such a manner as to be concentric with the first annular plate and has an outer diameter different from the inner diameter; and a bearing to the side of the output unit that is arranged between the first annular plate and the second annular plate and is rotated in such a manner that the first annular plate and the second annular plate are moved relatively to each other.

In the cycloidal reducer, a plurality of rotor pin accommodation portions may be formed in a lateral surface of the second annular plate in such a manner as to be equally spaced, in a circumferential direction of the second annular plate, and first end portions of the plurality of rotor pins may be coupled to the rotor pin accommodation portions, respectively, in a manner that is impossible to rotate.

In the cycloidal reducer, the first annular plate may be formed in such a manner that an outer diameter thereof is smaller than an inner diameter of the housing, and the output unit may be inserted into an inner circumferential surface of the housing.

In the cycloidal reducer, the output unit may include: a first output unit coupled to one surface of the cycloidal rotor and configured to accommodate first end portions of the plurality of rotor pins; and a second output unit coupled to the other surface of the cycloidal rotor and configured to accommodate second end portions of the plurality of rotor pins that are formed in a direction opposite to the first end portions thereof, the first output unit may include: a first annular plate in the shape of a ring that has a preset inner diameter; a second annular plate in the shape of a ring that is formed in such a manner as to be concentric with the first annular plate and has an outer diameter different from the inner diameter; and a bearing to the side of the first output unit that is arranged between the first annular plate and the second annular plate and is rotated in such a manner that the first annular plate and the second annular plate are moved relatively to each other, and the second output unit may include: a third annular plate in the shape of a ring that has a preset inner diameter; a fourth annular plate in the shape of a ring that is formed in such a manner as to be concentric with the third annular plate and has an outer diameter different from the inner diameter; and a bearing to the side of the second output unit that is arranged between the third annular plate and the fourth annular plate and is rotated in such a manner that the third annular plate and the fourth annular plate are moved relatively to each other.

In the cycloidal reducer, the reduction unit may further include: a rotor-to-output-unit connection member including a separation annular plate that has a separation rotor pin accommodation portion on one surface thereof which is formed at a position corresponding to the rotor pin and into which the rotor pin is inserted, and a separation protrusion portion formed on the center of the other surface of the separation annular plate in a manner that protrudes therefrom, and coupled to the output unit, and the rotor-to-output-unit connection member may be fastened to at least one of the first annular plate and the second annular plate.

In the cycloidal reducer, the inner pin may be formed of an elastic material, and the inner pin may be formed in a manner that has a space inside.

Advantageous Effects of Invention

As described in detail below, a cycloidal rotor that is used in a cycloidal reducer according to the present disclosure includes a recess portion having the shape of a circular-arc tooth, instead of in the shape of a cycloidal tooth. Therefore, the advantage of easily machining the cycloidal rotor and thus improving the productivity of the cycloidal reducer is provided.

In addition, a bushing is formed to fill a gap formed between each of the through-holes formed in the cycloidal rotor in an equally spaced manner and each of the rotor pins inserted into the through-holes, respectively. Thus, the advantage of distributing a radial load due to the rotor pin through the bushing and thus improving the durability of cycloidal reducer is provided.

DESCRIPTION OF EMBODIMENTS

Figure 1:
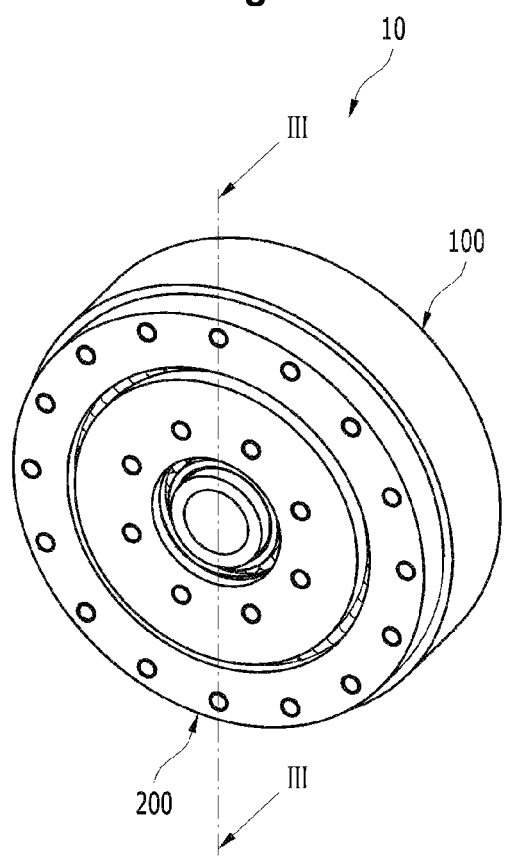
FIG. 1 is a perspective view illustrating a cycloidal reducer according to a first embodiment of the present disclosure.
Figure 2:
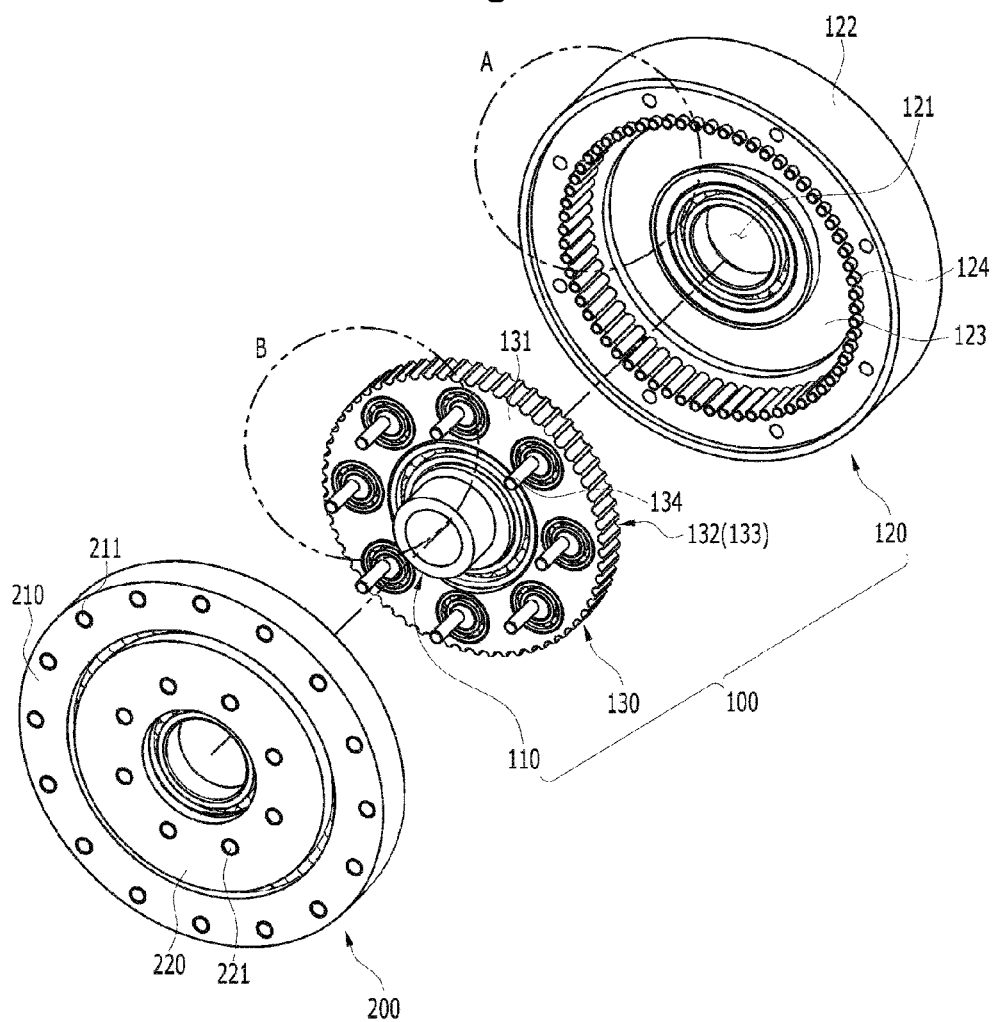
FIG. 2 is an exploded perspective view illustrating the cycloidal reducer in FIG. 1.
Figure 3:
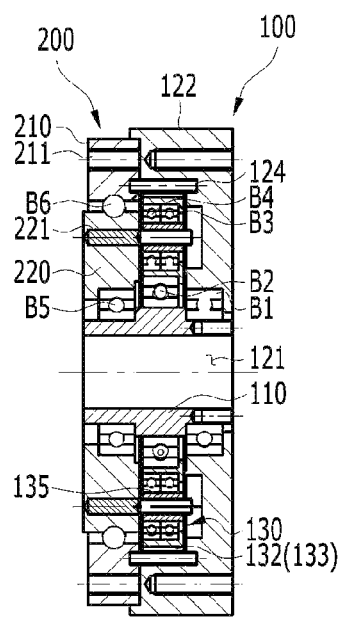
FIG. 3 is a cross-sectional view illustrating the cycloidal reducer in FIG. 1.
Figure 4:
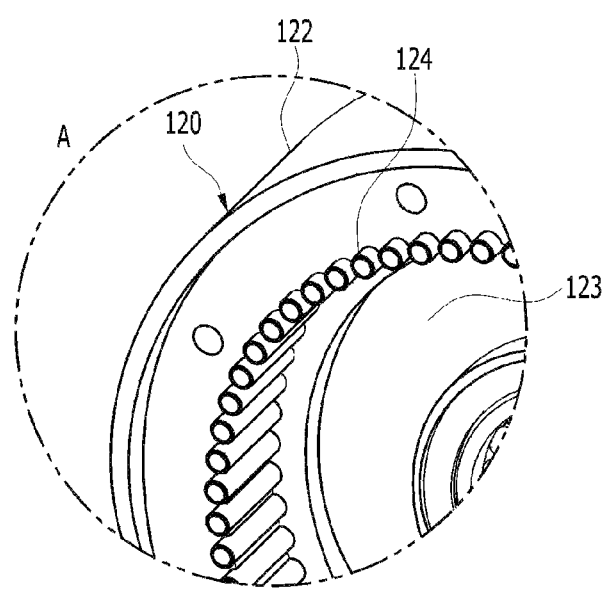
FIG. 4 is an enlarged view illustrating Portion A of FIG. 2.
Figure 5:
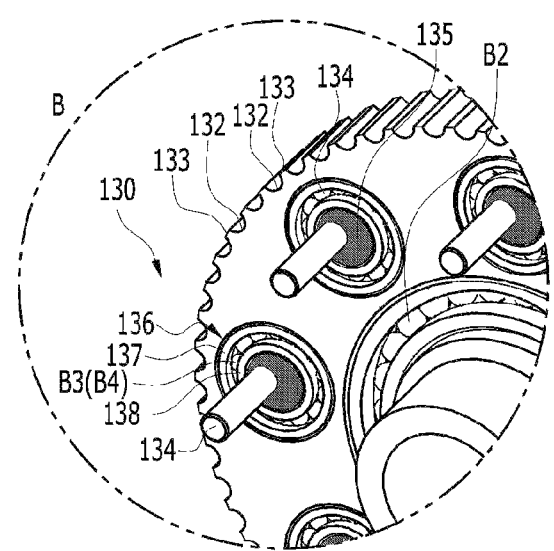
FIG. 5 is an enlarged view illustrating Portion B of FIG. 2.
Figure 6:
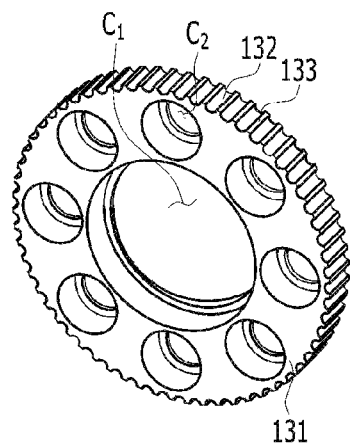
FIG. 6 is a perspective view illustrating a cycloidal disc of the cycloidal reducer in FIG. 1.
Figure 7:
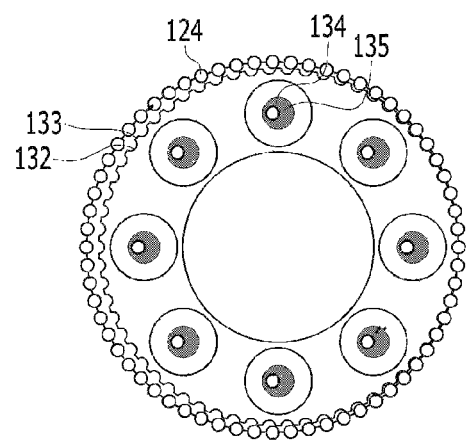
FIG. 7 is a view illustrating a state where a cycloidal rotor and an inner pin of a housing are engaged with each other in the cycloidal reducer in FIG. 1.
Figure 8:
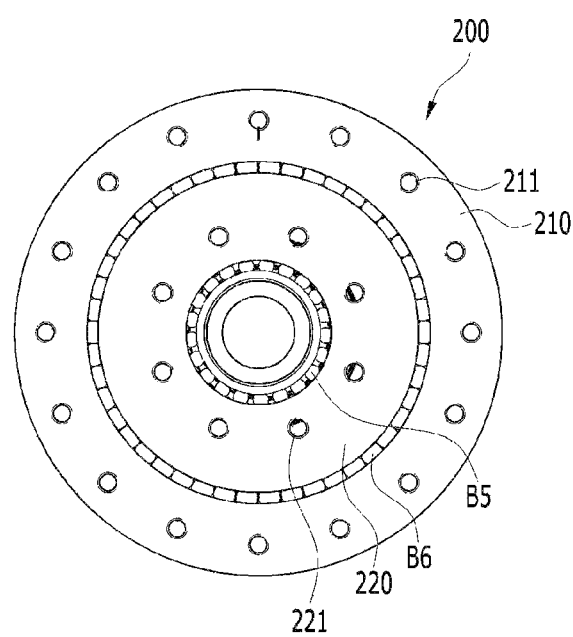
FIG. 8 is a front view illustrating an output unit of the cycloidal reducer in FIG. 1.

Embodiments of the present disclosure will be described in detail below referring to the drawings. It should be noted that the same constituent elements, although illustrated in different drawings, are given the same reference character, if possible, throughout the drawings. In addition, specific descriptions of a well-known configuration and function associated with the embodiments of the present disclosure will be omitted when determined as making the embodiments of the present disclosure difficult to understand.

The terms first, second, and so forth, the letters A, B, and so forth, and the letters in parentheses (a), (b), and so forth may be used to describe constituent elements according to each of the embodiments of the present disclosure. These terms and letters are used only to distinguish among the same constituent elements, and do not impose any limitation on the natures of the same constituent elements or the order thereof. In addition, unless otherwise defined, all terms, including technical or scientific terms, which are used in the present specification, have the same meanings as are normally understood by a person of ordinary skill in the art to which the present disclosure pertains. The term as defined in a dictionary in general use should be construed as having the same meaning as interpreted in context in the relevant technology, and, unless otherwise explicitly defined in the present application, is not construed as having an ideal meaning or an excessively-formal meaning.

FIGS. 1 to 9 are views that are referred to for description of a cycloidal reducer according to an embodiment of the present disclosure.

The cycloidal reducer according to the embodiment of the present disclosure will be described in detail below referring to FIGS. 1 to 9. A cycloidal reducer 10 according to a first embodiment of the present disclosure is coupled, in such a manner that drive power is transferrable, between a drive apparatus (not illustrated) and an output apparatus (not illustrated) that are coupled to each other along an axial direction. The drive apparatus is arranged on a front-end side input terminal of the cycloidal reducer 10 and, by rotational power of a motor, rotates a hollow input shaft 110 of the cycloidal reducer 10 that is a rear-end apparatus. The output apparatus is arranged on a rear-side output terminal of the cycloidal reducer 10. The output apparatus is supplied with a reduction torque that is preset through eccentric rotation of a cycloidal disc 131 arranged inside the cycloidal reducer 10, as an input torque of the motor or the like of the drive apparatus, and transfers an output torque to the outside. The front-end side here means the input terminal is supplied with the input torque of the drive apparatus and is set to be directed toward the hollow input shaft 110. The front-end side here means the output terminal that is set to be directed toward a hollow output shaft that transfers to the output torque to the outside.

The cycloidal reducer 10 according to the first embodiment of the present disclosure includes a reduction unit 100 that reduces the input torque and an output unit 200 that is supplied with the reduction torque that is preset through the reduction unit 100 and transfers the output torque to the outside. In addition, the reduction unit 100 includes the input shaft 110, a cycloidal rotor 130, and a housing 120, as constituent elements thereof.

The constituent elements of the reduction unit 100 will be described in detail below.

The input shaft 110 transfers the input torque to the cycloidal reducer 10 according to the present disclosure. The transferred input torque is reduced by engagement between the cycloidal rotor 130 and the housing 120 that will be described below, and thus the reduction torque is transferred to the output unit 200. The reduction unit 100 and the output unit 200, as illustrated, are coupled to each other along the same axial line direction.

The reduction unit 100 includes the cycloidal rotor 130 having a tooth-type protrusion 132 and 133 having a plurality of teeth. More specifically, an insertion hole C1 into which the input shaft 110 is to be inserted may be formed in the center of the cycloidal rotor 130. A plurality of through-holes C2 may be formed in a lateral surface of the cycloidal rotor 130 in such a manner as to be arranged to be equally spaced along a circumferential direction. The insertion hole C1 and the plurality of through-holes C2 are substantially formed in the cycloidal disc 131 in the shape of a flat disc.

The input shaft 110 is inserted into the insertion hole C1, and the cycloidal rotor 130 is coupled to an outer circumferential surface of the input shaft 110 in an eccentrically rotatable manner. When the cycloidal rotor 130 is eccentrically rotated, reduction is performed.

The cycloidal rotor 130 includes a plurality of rotor pins 134 that are arranged within the through-holes C2, respectively, that are arranged to be equally spaced along the circumferential direction toward the axial line direction of the input shaft 110. The rotor pins 134 are formed in such a manner as to protrude out of the through-hole C2. First end portions of the rotor pins 134 are coupled to the output unit 200 and transfer the reduction torque of the reduction unit 100 to the output unit 200.

The tooth-type protrusion 132 and 133 of the cycloidal rotor 130 will be described in more detail below. A configuration and a technical feature of the tooth-type protrusion 132 and 133 are the same as in a cycloidal reducer 20 according to a second embodiment of the present disclosure that will be described below and a cycloidal reducer 30 according to a third embodiment of the present disclosure that will be described below.

The tooth-type protrusion 132 and 133 of the cycloidal rotor 130 has a first radius of curvature and includes a recess portion 132 in the shape of a circular arc that is engaged with an inner pin 124 of the housing 120 described below. More specifically, the recess portion 132 is formed by being cut from a main body of the cycloidal disc 131 in the inner center direction and thus is formed in such a manner as to correspond to spacing between each of the inner pins 124. That is, the recess portion 132 is a space set back in the shape of a circular arc having the first radius of curvature. Spaces set back in the shape of an arc having the first radius of curvature are formed in such a manner as to be equally spaced along a circumference of an edge of the main body of the cycloidal disc 131.

A protrusion portion 133 is formed between the recess portions 132. The protrusion portion 133 has at least one radius of curvature that is different from the first radius of curvature, and protrudes between the recess portions 132. Theoretically, the protrusion portion 133 may be formed between each of the adjacent recess portions 132 and there may be formed as many recess portions 132 as the protrusion portions 133. The protrusion portion 133 does not come into contact with the inner pin 124 of the housing 120 and may serve to divide the recess portions 132.

A bushing 135 and a friction reduction means 136 that are constituent elements of the cycloidal rotor 130, and a relationship therebetween will be described in more detail below.

The cycloidal rotor 130 may further include the bushing 135 that is arranged between the through-hole C2 and the rotor pin 134. The bushing 135 fills a gap between the through-hole C2 and the rotor pin 134 and, when the rotor pin 134 is rotated, is rotated together with the rotor pin 134. When an external surface of the rotor pin 134 comes into point contact with the through-hole C2, stress concentrates on a contact portion. The concentration of the stress causes a decrease in the lifetime of the cycloidal reducer 10. In order to solve this problem, the bushing 135 having a shape for gap filling is formed in such a manner as to be coupled between the rotor pin 134 and the through-hole C2 in the cycloidal rotor 130. Therefore, when the rotor pin 134 comes into contact with the through-hole C2 through the bushing 135, contact is made with an entire outer circumferential surface of the rotor pin 134. Thus, the stress is distributed, and the lifetime of the cycloidal reducer 10 is prolonged.

The reduction unit 100 further includes the friction reduction means 136 that is formed in such a manner as to be inserted into the through-hole C2 in the cycloidal rotor 130. An outer circumferential surface of the friction reduction means 136 comes into contact with an inner circumferential surface of the through-hole C2, and an inner circumferential surface thereof comes into contact with the outer circumferential surface of the rotor pin 134. The friction reduction means, for example, may be a bearing. The various types of bearings, including a hydraulic bearing, a ball bearing, a pin bearing, a cross bearing, and the like, may be employed for use. However, the friction reduction means is not simply limited to the bearing. Any means capable of reducing friction occurring by the rotation of the cycloidal rotor 130 may be used as the friction reduction means.

The friction reduction means 136 includes a first ring portion 137 in the shape of a ring that comes into contact with the inner circumferential surface of the through-hole C2 and is concentric with the through-hole C2. The friction reduction means 136 includes a second ring portion 138 that has a smaller diameter than the first ring portion 137 and is formed in the shape of a circle concentric with the first ring portion 137. A bearing hole with which the through-hole C2 or the bushing 135 comes into contact is formed in an inner circumferential surface of the second ring portion 138. In this case, the friction reduction means 136 includes bearings B3 and B4, each of which is arranged between the first ring portion 137 and the second ring portion 138 and is rotated in such a manner that the first ring portion 137 and the second ring portion 138 are moved relative to each other.

More specifically, the friction reduction means 136 comes into contact with an outer circumferential surface of the busing 135 that, for coupling, is formed in such a manner that an outer circumferential surface of the first ring portion 137 comes into contact with the inner circumferential surface of the through-hole C2 and that an inner circumferential surface of the second ring portion 138 surrounds the rotor pin 134 or the outer circumferential surface of the rotor pin 134. Therefore, the friction reduction means 136 may effectively support a radial load or thrust load transferred between the bushing 135, formed on the rotor pin 134 or the outer circumferential surface of the rotor pin 134, and the cycloidal disc 131.

In this case, a diameter of the rotor pin 134 is equal to or greater than one tenth of an inner diameter of the bearing hole and is equal to and smaller than half of the inner diameter thereof. According to a relationship between the inner diameter of the bearing hole and the diameter of the rotor pin 134, the busing 135 of a suitable size may be selected and be coupled, and thus the cycloidal rotor 130 may serve to transfer rotation and reduction torques without any problem. In addition, the presence of the bushing 135 makes it possible to form the rotor pin 134 having a small diameter, thereby providing the advantage of reducing a manufacturing cost and improving the stability of the cycloidal reducer 10.

The bushing 135 includes an opening portion formed at a position on the busing 135 that is eccentric with respect to the center thereof, in a manner that passes therethrough. The opening portion of the bushing 135 is formed in a manner that is eccentrically arranged to one side with respect to the center thereof. The rotor pin 134 is coupled to the inner circumferential surface of the opening portion in a manner that passes therethrough. The coupled bushing 135 is coupled to an inner circumferential surface of the bearing hole in the friction reduction means without clearance by coming into contact therewith. The opening portion is formed in a manner that corresponds to a position where the rotor pin 134 is formed, in order that the busing 135 is coupled to the inner circumferential surface of the bearing hole without clearance by coming into contact with therewith and thus stably transfers a load in a distributed manner. When the bushing 135 is coupled to the rotor pin 134, rotation of the rotor pin 134 rotates the bushing 135 and thus the busing 135 may transfer the rotational power.

The busing 135 is formed of an elastic material in order that the busing 135 smoothly transfers the load. By being elastically transformed, the bushing 135 functions stably between the rotor pin 134 and the friction reduction means. In addition, the bushing 135 is formed in such a manner as to have the same strength as or a lower strength than the rotor pin 134. The bushing 135 may stably support the rotor pin 134.

The housing 120 of the cycloidal reducer 10 according to the first embodiment will be described in more detail below.

The hollow housing 120 is formed in the shape of a hollow cylinder that is open at the rear side, or in the shape of a cup. This shape is formed by a disc-shaped housing plate 123 having a housing space 121 and a housing sidewall 122 that is formed along a circumference of an edge of the housing plate 123. With this shape of the housing 120, the cycloidal rotor 130 is accommodated in the hollow housing 120.

A plurality of inner pin fixation grooves are formed in an inner circumferential surface of the housing sidewall 122 along a circumference of the inner circumferential surface thereof, and a plurality of inner pins 124 are arranged in the plurality of inner fixation grooves, respectively, that are formed along the circumference of the inner circumferential surface thereof. The inner pin 124 is engaged with the tooth-type protrusion 132 and 133 of the cycloidal rotor 130, and thus the cycloidal rotor 130 is caused to be smoothly rotated.

The inner pin 124 is formed of an elastic material, and the inner pin 124 is formed in a manner that has a space inside. When the inner pin 124 is formed of the elastic material, the inner pin 124 is engaged with the tooth-type protrusion 132 and 133 of the cycloidal rotor 130 and thus stably supports a load transferred from the cycloidal rotor 130. In addition, when the inner pin 124 is formed in a manner that has a space inside, the inner pin 124 is more easily transformed through the space. Therefore, the inner pin 124 may effectively support the load transferred from the cycloidal rotor 130.

An engagement relationship between the cycloidal rotor 130 and the inner pin 124, or the like will be additionally described below. By the rotation of the cycloidal rotor 130, the recess portion 132 repeats a process of being engaged with the inner pin 124 of the housing 120 and then being disengaged therefrom. The reduction torque of the cycloidal rotor 130 is adjusted by repeating this process of being engaged with the inner pin 124 of the housing 120 and then being disengaged therefrom. At this point, the recess portion 132 has a circumferential length smaller than a circumferential length of an imaginary semicircle having the first radius of curvature. Therefore, an abnormal situation where the inner pin 124 is not engaged with the recess portion 132 can be prevented. In addition, the inner pin 124 to be arranged in the inner pin fixation groove in the housing 120 is formed in such a manner that a cross-section thereof is in the shape of a circle having a fourth radius of curvature that is the same as the first radius of curvature of the recess portion 132 or is smaller than the first radius of curvature. Therefore, the inner pin 124 having the fourth radius of curvature that is the same as or is smaller than the first radius of curvature may be stably engaged with the recess portion 132.

The above-described plurality of inner pin fixation grooves are formed in such a manner that circumferential lengths thereof are greater than or the same as a circumferential length of a semicircle having the fourth radius of curvature, and half or more of the circumference of the inner pin 124 is accommodated in the inner pin fixation groove. Therefore, when the cycloidal reducer 10 according to the first embodiment of the present disclosure operates, the inner pin 124 is stably accommodated in the inner pin fixation groove without deviating from the housing 120.

A relationship between the recess portion 132 in the cycloidal rotor 130 and the inner pin 124 of the housing 120, and a relationship between the recess portion 132 and the protrusion portion 133 for smooth rotation of the cycloidal rotor 130 will be additionally described below.

The recess portion 132 to be engaged with the inner pin 124 is formed at a position where, when the recess portion 132 is engaged with the inner pin 124, the center of the recess portion 132 is spaced a distance away from the center of the cycloidal rotor 130 with the center of the inner pin 124 in between. More specifically, when the recess portion 132 and the inner pin 124 are engaged with each other, a radius of a circular-arc curvature (the first radius of curvature) of the recess portion 132 is greater than or the same as a radius of curvature (the fourth radius of curvature) of the inner pin 124. Since the first radius of curvature is greater than or the same as the fourth radius of curvature, the center of the recess portion 132 is spaced a greater distance away from the center of the cycloidal rotor 130 than the center of the inner pin 124. Therefore, the recess portion 132 and the inner pin 124 may be stably engaged with each other.

In the cycloidal reducer 10 according to the first embodiment of the present disclosure, the protrusion portion 133 of the cycloidal rotor 130 does not substantially come into contact with an external surface of the inner pin 124. However, there is also a likelihood that the protrusion portion 133 and the inner pin 124 will come into contact with each other when a rotation distance is short or excessively long due to malfunctioning of the cycloidal rotor 130. In this case, a predetermined radius of curvature is retained in order for the cycloidal reducer 10 to operate smoothly without stopping. For example, a central protrusion portion having a second radius of curvature is formed on the center of the protrusion portion 133, and a lateral-surface protrusion portion is formed symmetrically about the central protrusion portion and has a third radius of curvature different from the second radius of curvature. Through the formation of the central protrusion portion and the lateral-surface protrusion portion, the protrusion portion 133 is formed in such a manner as to be continuous with the recess portion 132. Thus, although the inner pin 124 comes into contact with a part of the protrusion portion 133, the inner pin 124 may be naturally slid to one side of the protrusion portion 133 and may be stably accommodated in the recess portion 132.

A difference (a difference in the number of teeth) between the number of the recess portions 132 in the cycloidal rotor 130 and the number of the inner pins 124 accommodated in the inner pin fixation grooves in the housing 120 is 2 or greater. For example, 20 recess portions 132 are formed, and 22 inner pins 124 may be arranged. Alternatively, 22 recess portions 132 are formed, and 20 inner pins 124 may be arranged. In a case where the difference between the number of the recess portions 132 and the number of the inner pins 124 is 2 or greater, when the cycloidal rotor 130 is rotated, a recess portion 132 and an inner pin 124 are engaged, while the other recess portion 132 and the other inner pin 124 are spaced apart each other with facing. In this case, all outer circumferential surfaces (including the tooth-type protrusions) of the cycloidal rotor 130 do not come into contact with the inner pins 124 and the like of the housing 120. Thus, the advantage of reducing friction while the cycloidal reducer 10 operates is provided, when compared with a case where the difference between the number of the recess portions 132 and the number of the inner pins 124 is 1 in the cycloidal reducer 10.

A configuration of the output unit 200 of the cycloidal reducer 10 according to the first embodiment of the present disclosure will be described in detail below.

In the cycloidal reducer 10, the output unit 200 includes a first annular plate 210 in the shape of a ring that has a preset inner diameter. In addition, the output unit 200 includes a second annular plate 220 in the shape of a ring that is formed in such a manner as to be concentric with the first annular plate and has an outer diameter different from the inner diameter of the first annular plate 210. The output unit 200 includes a bearing B6 to the side of the output unit 200 that is arranged between the first annular plate 210 and the second annular plate 220 and is rotated in such a manner that the first annular plate 210 and the second annular plate 220 are moved relatively to each other.

An external accommodation groove 211 that is connected to the output unit 200 and is capable of transferring the output torque to the outside is formed in a lateral surface of the first annular plate 210. The external accommodation groove 211 transfers the output torque to another component or apparatus that is connected through the cycloidal reducer 10.

A plurality of rotor pin accommodation portions 221 are arranged in a lateral surface of the second annular plate 220 in such a manner as to be arranged to be equally spaced in a circumferential direction of the second annular plate 220. First end portions of the rotor pins 134 that are accommodated in the through-holes C2, respectively, in the above-described cycloidal rotor 130 are accommodated in the rotor pin accommodation portions 221, respectively, for being coupled thereto. The rotor pin 134 and the rotor pin accommodation portion 221 may be formed in such a manner that respective diameters thereof are substantially the same, and thus the rotor pins 134 accommodated in the rotor pin accommodation portions 221, respectively, may be caused not to deviate therefrom. When the first end portions of the rotor pins 134 are once coupled to the rotor pin accommodation portions 221, respectively, the first end portions thereof are impossible to rotate unilaterally. However, the rotor pin 134 operates in conjunction with the rotor pin accommodation portion 221, and when the cycloidal rotor 130 is rotated, the second annular plate 220 may be rotated together therewith. Bearings B6 are formed between the first annular plate 210 and the second annular plate 220 in order to reduce and support friction, and the radial load and thrust load, respectively, that occur due to the rotation of the second annular plate 220 that is caused by the rotation of the cycloidal rotor 130.

In addition, the friction reduction means including a bearing B5 is formed on an inner circumferential surface of the second annular plate 220 in order to reduce and support the friction and the radial load and thrust load that occur with respect to the input shaft 110.

The first annular plate 210 is formed in such a manner that an outer diameter thereof is smaller than an inner diameter of the housing 120, and the output unit 200 is inserted into an inner circumferential surface of the housing 120. More specifically, the first annular plate 210 is formed in such a manner that an outer circumferential surface thereof is smaller than the inner circumferential surface of the housing sidewall 122, and one or several portions or all portions of the output unit 200 are substantially accommodated in the housing 120. Therefore, the output unit 200 is stably accommodated in the housing 120, and thus the stability of the entire cycloidal reducer 10 is improved.

The cycloidal reducer 20 according to the second embodiment of the present disclosure will be described in detail below. A constituent element that is the same as that of the above-described cycloidal reducer 10 according to the first embodiment of the present disclosure is described briefly or is not described.

Figure 9:
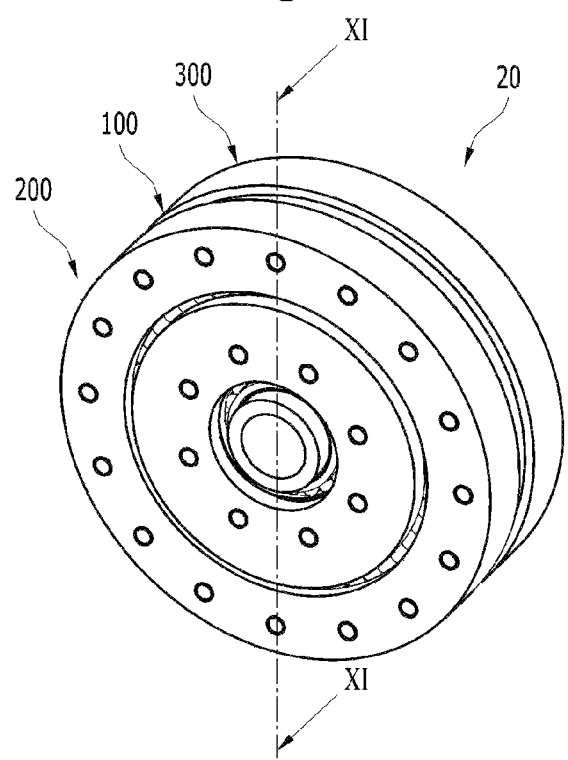
FIG. 9 is a perspective view illustrating a cycloidal reducer according to a second embodiment of the present disclosure.
Figure 10:
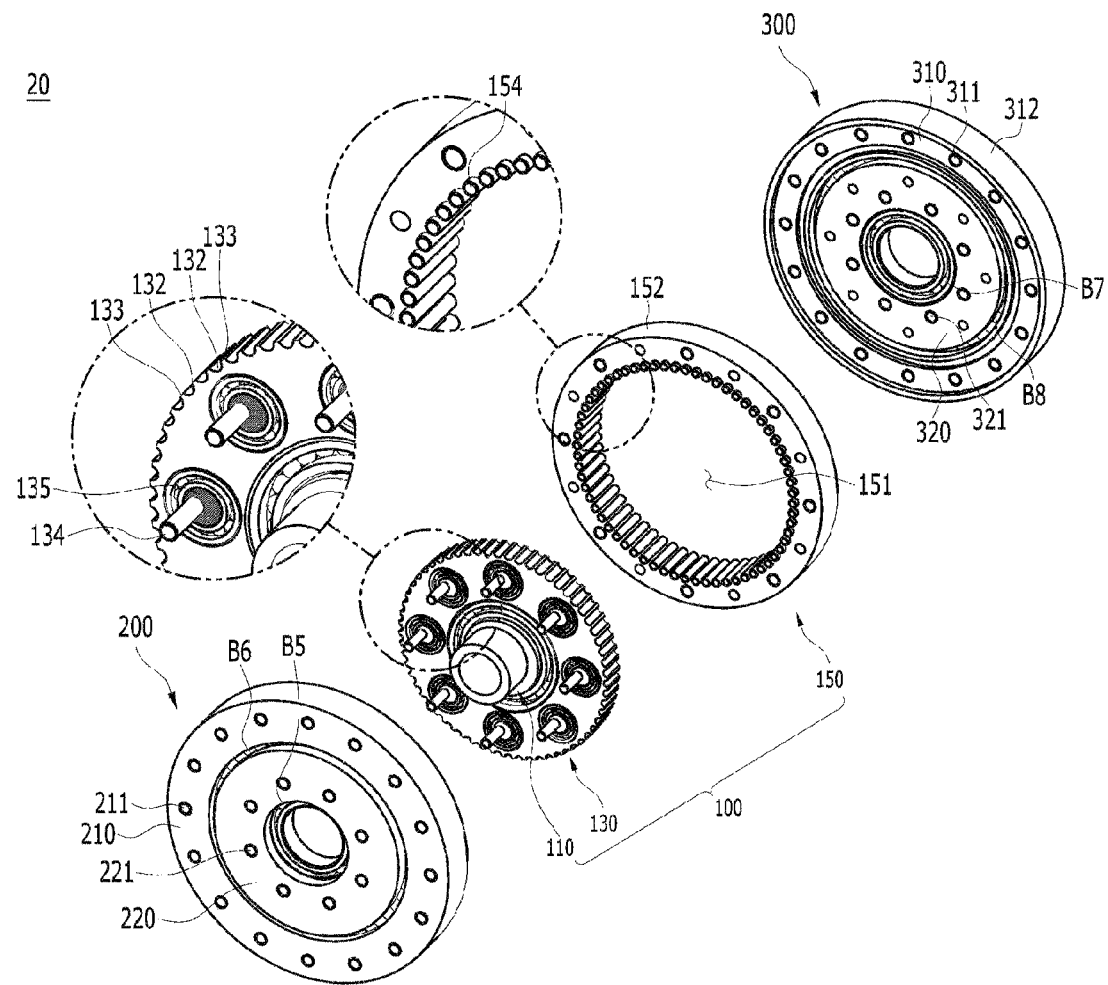
FIG. 10 is an exploded perspective view illustrating the cycloidal reducer in FIG. 9.
Figure 11:
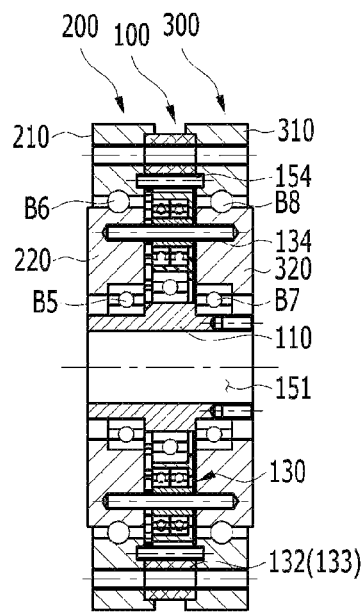
FIG. 11 is a cross-sectional view illustrating the cycloidal reducer in FIG. 9.

FIGS. 9 to 11 are views that are referred to for description of the cycloidal reducer 20 according to the second embodiment of the present disclosure.

Referring to FIGS. 9 to 11, a difference from the cycloidal reducer 10 according to the first embodiment of the present disclosure is that the cycloidal reducer 20 according to the second embodiment of the present disclosure includes two output units 200 and 300 that are both end portions, respectively, of the reduction unit 100. That is, the output units 200 and 300 includes a first output unit 200 and a second output unit 300. The first output unit 200 is coupled to one surface of the cycloidal rotor 130 and accommodates first end portions of the plurality of rotor pins 134. The second output unit 300 is coupled to the other surface of the cycloidal rotor 130 and accommodates second end portions of the plurality of rotor pins 134 that are formed in such a manner as to face first end portions, respectively, thereof. With this structure, the reduction torque transferred by the rotor pin 134 may be simultaneously transferred to the first output unit 200 and the second output unit 300 through the first and second end portions of the rotor pin 134. Therefore, there is provided an advantage in that the cycloidal reducer 20 transfers the output torque in the opposite direction.

The first output unit 200 includes the first annular plate 210 in the shape of a ring that has a predetermined inner diameter, and the second annular plate 220 that is formed in such a manner as to be concentric with the first annular plate 210 and has an outer diameter different from an inner diameter. In addition, the first output unit 200 includes the bearing B6 to the side of the first output unit 200 that is arranged between the first annular plate 210 and the second annular plate 220 and is rotated in such a manner that the first annular plate 210 and the second annular plate 220 are moved relatively to each other.

In addition, the second output unit 300 includes a third annular plate 310 in the shape of a ring that has a predetermined inner diameter, and a fourth annular plate 320 in the shape of a ring that is formed in such a manner as to be concentric with the third annular plate 310 and has an outer diameter different from an inner diameter of the third annular plate 310. Additionally, the second output unit 300 includes a bearing B8 on the second output unit 300 that is arranged between the third annular plate 310 and the fourth annular plate 320 and is rotated in such a manner that the third annular plate 310 and the fourth annular plate 320 are moved relatively to each other.

Detailed configuration and operation of the first output unit 200 are the same as those of the output unit 200 of the cycloidal reducer 10 according to the first embodiment of the present disclosure. In addition, detailed configuration and operation of the second output unit 300 are the same as those of the first output unit 200, and the second output unit 300 is formed in such a manner that the second output unit 300 and the first output unit 200 are symmetrical. That is, the third annular plate 310 corresponds to the first annular plate 210, and the fourth annular plate 320 corresponds to the second annular plate 220. An external accommodation groove 311 to the side of the second output unit 300 corresponds to the external accommodation groove 211 to the side of the first output unit 200, and a rotor pin accommodation portion 321 to the side of the second output unit 300 corresponds to the rotor pin accommodation portion 221 to the side of the second output unit 300. In addition, the bearing B8 to the side of the second output unit 300 corresponds to the bearing B6 to the side of the first output unit 200, and a bearing B7 on an inner circumferential surface of the fourth annular plate 320 corresponds to the bearing B5 on the inner circumferential surface of the second annular plate 220.

In the cycloidal reducer 20 according to the second embodiment of the present disclosure, the first end portion of the rotor pin 134 is coupled to the rotor pin accommodation portion 221 of the second annular plate 220 in a manner that is impossible to rotate. The second end portion of the rotor pin 134 is coupled to the rotor pin accommodation portion 321 of the fourth annular plate 320 in a manner that is impossible to rotate. Therefore, when the cycloidal rotor 130 is rotated, the first output unit 200 and the second output unit 300 may be conjunctionally rotated together therewith.

In the cycloidal reducer 20 according to the second embodiment of the present disclosure, a housing 150 that is one constituent element of the reduction unit 100 has a housing space 151 and a housing sidewall 152 in the shape of a ring, but does not have a housing plate in the shape of a circular plate. The reduction torque may be transferred to the first output unit 200 and the second output unit 300 that are formed on both end portions, respectively, of the cycloidal rotor 130, through the rotor pin 134. The housing 150 may include a plurality of inner pins 154 for being engaged with a plurality of tooth-type protrusions 132 and 133, respectively, of the cycloidal rotor 130, and the inner pin 154 has the same configuration as the inner pin 124 of the above-described cycloidal reducer 10 according to the first embodiment.

In addition, unlike the cycloidal reducer 10 according to the first embodiment of the present disclosure, the cycloidal reducer 20 according to the second embodiment of the present disclosure includes an output unit of which an outer diameter is smaller than an inner diameter of the housing sidewall 152, or the same as the inner diameter thereof. More specifically, a first housing accommodation portion (not illustrated) is formed in the first annular plate 210 of the first output unit 200, and a second housing accommodation portion 312 is formed in the third annular plate 310 of the second output unit 300. The first housing accommodation portion and the second housing accommodation portion 312 are formed in such a manner that respective inner diameters thereof are greater than or the same as an outer diameter of the housing sidewall 152. Therefore, the housing 150 is caused to be stably accommodated between the first output unit 200 and the second output unit 300. There is provided an advantage in that, with this coupling, the first output unit 200 and the second output unit 300 are easily assembled to the reduction unit 100.

The cycloidal reducer 30 according to the third embodiment of the present disclosure will be described below.

Figure 12:
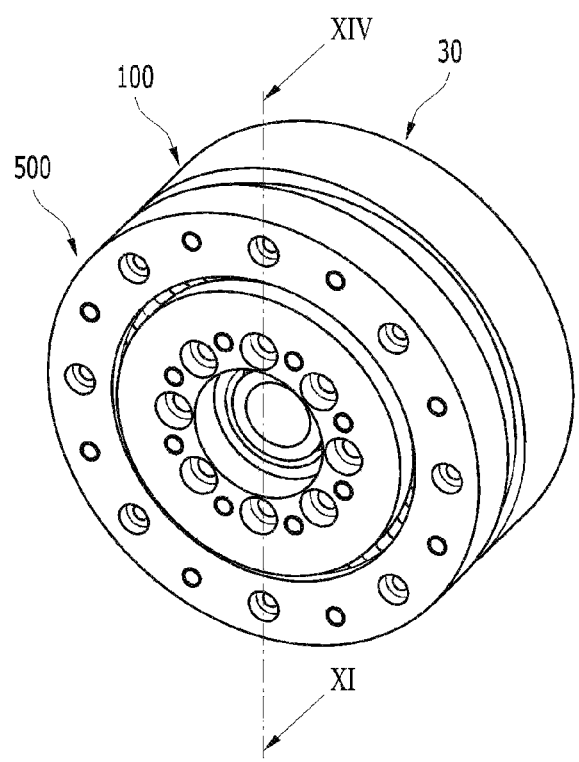
FIG. 12 is a perspective view illustrating a cycloidal reducer according to a third embodiment of the present disclosure.
Figure 13:
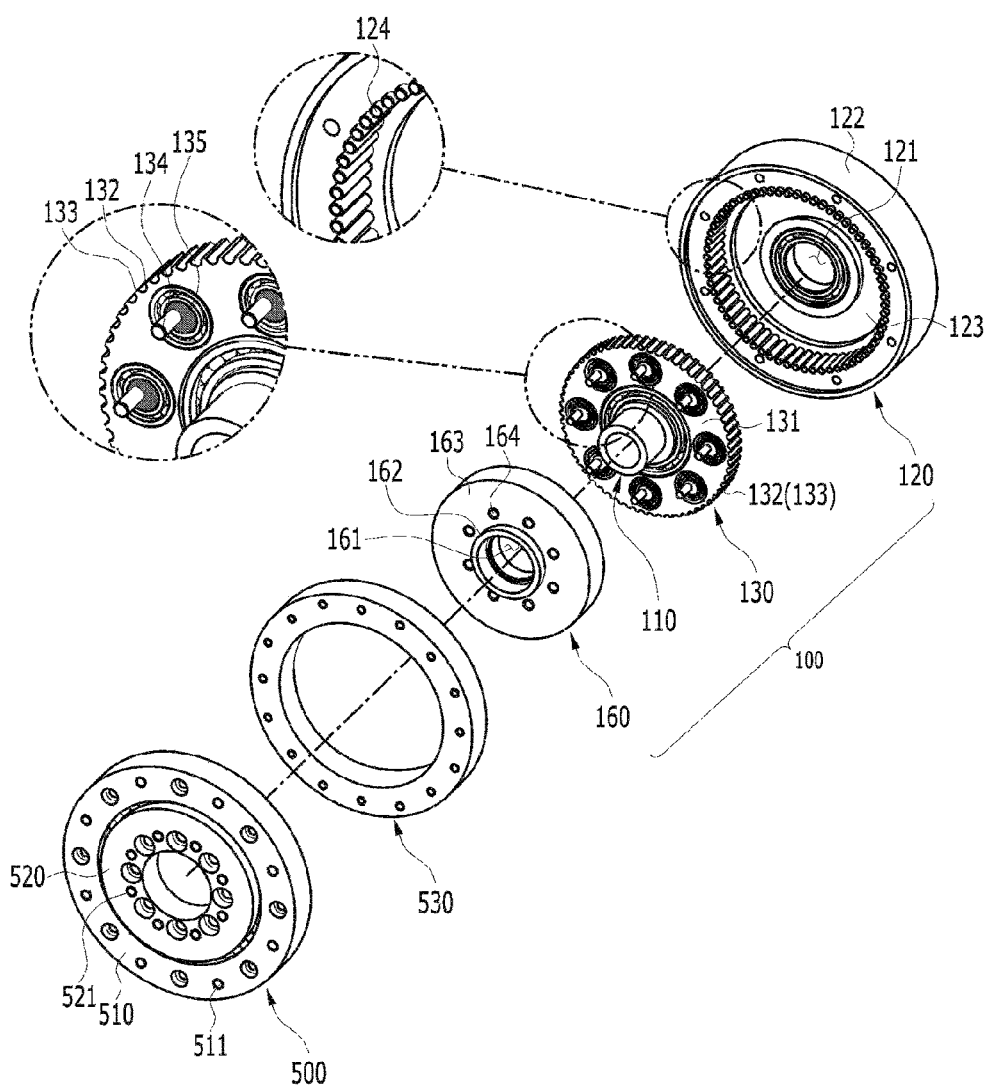
FIG. 13 is an exploded perspective view illustrating the cycloidal reducer in FIG. 12.
Figure 14:
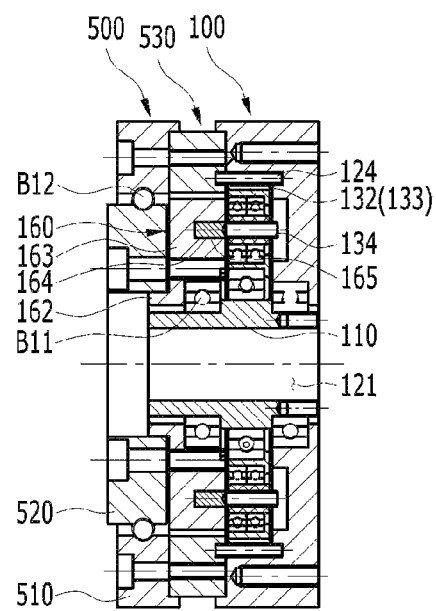
FIG. 14 is a cross-sectional view illustrating the cycloidal reducer in FIG. 12.

FIGS. 12 to 14 are views that are referred to for description of the cycloidal reducer 30 according to the third embodiment of the present disclosure.

Referring to FIGS. 12 to 14, the cycloidal reducer 30 according to the third embodiment of the present disclosure includes the reduction unit 100 and an output unit 500. The reduction unit 100 further includes a rotor-to-output-unit connection member 160, as additional constituent elements, on one surface thereof between the cycloidal rotor 130 and the output unit 500. The rotor-to-output-unit connection member 160 includes a separation annular plate 163 and a separation protrusion portion 162. The separation annular plate 163 has a separation rotor pin accommodation portion 165 which is formed at a position corresponding to the rotor pin 134 and into which the rotor pin 134 is inserted. The separation protrusion portion 162 is formed in such a manner as to protrude out of the center of the other surface of the separation annular plate 163, that is, out of a separation annular plate hollow space 161 and is coupled to the output unit 500. The rotor-to-output-unit connection member 160 may connect the cycloidal rotor 130 and the output unit 500 to each other and may transfer the reduction torque transferred from the rotor pin 134 to the output unit 500.

The rotor-to-output-unit connection member 160 may be fastened to at least one of a first annular plate 510 and a second annular plate 520 that constitutes the output unit 500. More specifically, for coupling of the rotor-to-output-unit connection member 160, the rotor pin 134 is coupled to the separation rotor pin accommodation portion 165 by being inserted thereinto, and output unit coupling grooves 164 formed in a rear surface of the rotor-to-output-unit connection member 160 may be arranged to be spaced the same distance apart as accommodation grooves 521 in the second annular plate 520 of the output unit 500 and may be coupled. With the coupling of the rotor-to-output-unit connection member 160 and the output unit 500 through the output unit coupling groove 164 and the accommodation groove 521, a torque transferred from the rotor pin 134 may be stably transferred up to the output unit 500.

A cover member 530 may be additionally formed on an external surface of the rotor-to-output-unit connection member 160. The cover member 530 is coupled between the output unit 500 and the cycloidal rotor 130, and thus a necessary clearance is secured between the output unit 500 and the cycloidal rotor 130. Consequently, the risk that the rotor-to-output-unit connection member 160 will deviate due to a centrifugal force while being rotated is prevented. In addition, the cover member 530 covers an external surface of the rotor-to-output-unit connection member 160 and protects the rotor-to-output-unit connection member 160 from the external environment. The cover member 530 may be formed in such a manner as to have a shape and a size that correspond to the output unit 500, the rotor-to-output-unit connection member 160, and the cycloidal rotor 130, and may serve to guide maintaining of the concentricity of the constituent elements when the cycloidal reducer is assembled.

However, the technical idea of the present disclosure is described above only in an exemplary manner. It is apparent to a person of ordinary skill in the art to which the present disclosure pertains that various alterations and modifications are possibly made to the embodiments of the present disclosure without departing from the nature and gist of the present disclosure.

Therefore, the embodiments disclosed in the present specification are for describing, rather than limiting, the technical idea of the present disclosure and do not impose any limitation on the scope of the technical idea of the present disclosure. Accordingly, the scope of protection of the present disclosure should be defined by the following claims. All technical ideas that fall within the scope equivalent thereto should be interpreted to be included within the scope of the claims of the present disclosure.

INDUSTRIAL APPLICABILITY

Cycloidal reducers according to the present disclosure finds application as cycloidal reduction apparatuses and the like and thus satisfy a requirement for industrial applicability.

The invention claimed is:

1. A cycloidal reducer comprising:
a reduction unit configured to reduce an input torque; and
an output unit configured to be supplied with a preset reduction torque through the reduction unit and to transfer an output torque to the outside,
wherein the reduction unit comprises:
an input shaft configured to be supplied with the input torque;
a cycloidal rotor arranged on an outer circumferential surface of the input shaft in an eccentrically rotatable manner, a plurality of through-holes being formed in a lateral surface of the cycloidal rotor in such a manner as to be arranged to be equally spaced along a circumferential direction thereof, and tooth-type protrusions being formed in the lateral surface thereof along a circumference of an edge thereof;
a hollow housing configured to accommodate the cycloidal rotor and including a plurality of inner pins that are arranged along a circumference of an inner circumferential surface thereof in such a manner as to possibly come into contact with the tooth-type protrusions, respectively, of the cycloidal rotor; and
a plurality of rotor pins arranged within the plurality of through-holes, respectively, in the cycloidal rotor arranged in an axial line direction of the input shaft,
wherein the tooth-type protrusions of the cycloidal rotor are formed in such a manner as to be equally spaced along the circumference of the edge of the cycloidal rotor, and
wherein each of the tooth-type protrusions comprises:
a recess portion in the shape of a circular arc that has a first radius of curvature and is engaged with each of the plurality of inner pins; and
a protrusion portion having at least one radius of curvature different from the first radius of curvature and formed in such a manner as to protrude between the recess portions;
wherein a difference in the number of teeth, which is a difference between the number of the recess portions and the number of the inner pins, is 2 or greater, and
wherein the recess portion has a circumferential length that is smaller than a circumferential length of a semicircle having the first radius of curvature,
wherein the inner pin of the housing is formed in the shape of a circle in such a manner that an outer circumferential surface thereof has a fourth radius of curvature that is the same as the first radius of curvature or is smaller than the first radius of curvature, and
wherein a plurality of inner pin fixation grooves within which the plurality of inner pins, respectively, are fixed, are formed in an inner circumferential surface of the housing, and each of the plurality of inner pin fixation grooves has a circumferential length that is greater than or the same as a circumferential length of a semicircle having the fourth radius of curvature.

2. The cycloidal reducer of claim 1, wherein the protrusion portion comprises:
a central protrusion portion formed on the center of the protrusion portion and having a second radius of curvature; and
a lateral-surface protrusion portion formed symmetrically about the central protrusion portion and having a third radius of curvature different from the second radius of curvature.

3. The cycloidal reducer of claim 1, wherein the reduction unit further comprises:
a bushing arranged between the through-hole and the rotor pin and configured to fill a gap between the through-hole and the rotor pin and thus to be rotated together with the rotor pin when the rotor pin is rotated;
wherein the bushing is formed of an elastic material and has the same strength as or a lower strength than the rotor pin.

4. The cycloidal reducer of claim 3, wherein the reduction unit further comprises:
a friction reduction means which is formed in such a manner as to be inserted into the through-hole in the cycloidal rotor, of which an outer circumferential surface comes into contact with an inner circumferential surface of the through-hole, and of which an inner circumferential surface comes into contact with an outer circumferential surface of the rotor pin;
wherein the friction reduction means comprises:
a first ring portion configured to come into contact with the inner circumferential surface of the through-hole and being concentric with the through-hole;
a second ring portion formed in such a manner as to be concentric with the first ring portion while having a smaller diameter than the first ring portion, the inner circumferential surface thereof forming a bearing hole; and
a bearing formed between the first ring portion and the second ring portion and rotated in such a manner that the first ring portion and the second ring portion are rotated relatively to each other,
wherein a diameter of the rotor pin is equal to or greater than one tenth of an inner diameter of the bearing hole and is equal to and smaller than half of the inner diameter thereof.

5. The cycloidal reducer of claim 3, wherein the bushing includes an opening portion formed at a position on the bushing that is eccentric with respect to the center thereof, in a manner that passes therethrough, and the rotor pin is rotatably inserted into the opening portion of the bushing.

6. The cycloidal reducer of claim 1, wherein the output unit comprises:
a first output unit coupled to one surface of the cycloidal rotor and configured to accommodate first end portions of the plurality of rotor pins; and
a second output unit coupled to the other surface of the cycloidal rotor and configured to accommodate second end portions of the plurality of rotor pins that are formed in a direction opposite to the first end portions thereof,
wherein the first output unit comprises:
a first annular plate in the shape of a ring that has a preset inner diameter;

a second annular plate in the shape of a ring that is formed in such a manner as to be concentric with the first annular plate and has an outer diameter different from the inner diameter; and
a bearing to the side of the first output unit that is arranged between the first annular plate and the second annular plate and is rotated in such a manner that the first annular plate and the second annular plate are moved relatively to each other, and
wherein the second output unit comprises:
a third annular plate in the shape of a ring that has a preset inner diameter;
a fourth annular plate in the shape of a ring that is formed in such a manner as to be concentric with the third annular plate and has an outer diameter different from the inner diameter; and
a bearing to the side of the second output unit that is arranged between the third annular plate and the fourth annular plate and is rotated in such a manner that the third annular plate and the fourth annular plate are moved relatively to each other.

7. A cycloidal reducer comprising:
a reduction unit configured to reduce an input torque; and
an output unit configured to be supplied with a preset reduction torque through the reduction unit and to transfer an output torque to the outside,
wherein the reduction unit comprises:
an input shaft configured to be supplied with the input torque;
a cycloidal rotor arranged on an outer circumferential surface of the input shaft in an eccentrically rotatable manner, a plurality of through-holes being formed in a lateral surface of the cycloidal rotor in such a manner as to be arranged to be equally spaced along a circumferential direction thereof, and tooth-type protrusions being formed in the lateral surface thereof along a circumference of an edge thereof;
a hollow housing configured to accommodate the cycloidal rotor and including a plurality of inner pins that are arranged along a circumference of an inner circumferential surface thereof in such a manner as to possibly come into contact with the tooth-type protrusions, respectively, of the cycloidal rotor; and
a plurality of rotor pins arranged within the plurality of through-holes, respectively, in the cycloidal rotor arranged in an axial line direction of the input shaft,
wherein the tooth-type protrusions of the cycloidal rotor are formed in such a manner as to be equally spaced along the circumference of the edge of the cycloidal rotor, and
wherein each of the tooth-type protrusions comprises:
a recess portion in the shape of a circular arc that has a first radius of curvature and is engaged with each of the plurality of inner pins; and
a protrusion portion having at least one radius of curvature different from the first radius of curvature and formed in such a manner as to protrude between the recess portions;
wherein a difference in the number of teeth, which is a difference between the number of the recess portions and the number of the inner pins, is 2 or greater,
wherein the output unit comprises:
a first annular plate in the shape of a ring that has a preset inner diameter;
a second annular plate in the shape of a ring that is formed in such a manner as to be concentric with the first annular plate and has an outer diameter different from the inner diameter; and
a bearing to the side of the output unit that is arranged between the first annular plate and the second annular plate and is rotated in such a manner that the first annular plate and the second annular plate are moved relatively to each other;
wherein the first annular plate is formed in such a manner that an outer diameter thereof is smaller than an inner diameter of the housing, and the output unit is inserted into an inner circumferential surface of the housing,
wherein a plurality of rotor pin accommodation portions are formed in a lateral surface of the second annular plate in such a manner as to be equally spaced, in a circumferential direction of the second annular plate, and
wherein first end portions of the plurality of rotor pins are coupled to the rotor pin accommodation portions, respectively, in a manner that is impossible to rotate.

8. The cycloidal reducer of claim 7, wherein the reduction unit further comprises:
a rotor-to-output-unit connection member including a separation annular plate that has a separation rotor pin accommodation portion on one surface thereof which is formed at a position corresponding to the rotor pin and into which the rotor pin is inserted, and a separation protrusion portion formed on the center of the other surface of the separation annular plate in a manner that protrudes therefrom, and coupled to the output unit, and
wherein the rotor-to-output-unit connection member is fastened to at least one of the first annular plate and the second annular plate.

9. A cycloidal reducer comprising:
a reduction unit configured to reduce an input torque; and
an output unit configured to be supplied with a preset reduction torque through the reduction unit and to transfer an output torque to the outside,
wherein the reduction unit comprises:
an input shaft configured to be supplied with the input torque;
a cycloidal rotor arranged on an outer circumferential surface of the input shaft in an eccentrically rotatable manner, a plurality of through-holes being formed in a lateral surface of the cycloidal rotor in such a manner as to be arranged to be equally spaced along a circumferential direction thereof, and tooth-type protrusions being formed in the lateral surface thereof along a circumference of an edge thereof;
a hollow housing configured to accommodate the cycloidal rotor and including a plurality of inner pins that are arranged along a circumference of an inner circumferential surface thereof in such a manner as to possibly come into contact with the tooth-type protrusions, respectively, of the cycloidal rotor;
a plurality of rotor pins arranged within the plurality of through-holes, respectively, in the cycloidal rotor arranged in an axial line direction of the input shaft; and
a bushing arranged between the through-hole and the rotor pin and configured to fill a gap between the through-hole and the rotor pin and thus to be rotated together with the rotor pin when the rotor pin is rotated;
wherein the bushing is formed of an elastic material and has the same strength as or a lower strength than the rotor pin, and wherein the tooth-type protrusions of the cycloidal rotor are formed in such a manner as to be equally spaced along the circumference of the edge of the cycloidal rotor, and wherein each of the tooth-type protrusions comprises:

a recess portion in the shape of a circular arc that has a first radius of curvature and is engaged with each of the plurality of inner pins; and a protrusion portion having at least one radius of curvature different from the first radius of curvature and formed in such a manner as to protrude between the recess portions;

wherein a difference in the number of teeth, which is a difference between the number of the recess portions and the number of the inner pins, is 2 or greater.

10. The cycloidal reducer of claim 9, wherein the bushing includes an opening portion formed at a position on the bushing that is eccentric with respect to the center thereof, in a manner that passes therethrough, and the rotor pin is rotatably inserted into the opening portion of the bushing.

11. The cycloidal reducer of claim 9, wherein the reduction unit further comprises:

a friction reduction means which is formed in such a manner as to be inserted into the through-hole in the cycloidal rotor, of which an outer circumferential surface comes into contact with an inner circumferential surface of the through-hole, and of which an inner circumferential surface comes into contact with an outer circumferential surface of the rotor pin;

wherein the friction reduction means comprises:

a first ring portion configured to come into contact with the inner circumferential surface of the through-hole and being concentric with the through-hole;

a second ring portion formed in such a manner as to be concentric with the first ring portion while having a smaller diameter than the first ring portion, the inner circumferential surface thereof forming a bearing hole; and a bearing formed between the first ring portion and the second ring portion and rotated in such a manner that the first ring portion and the second ring portion are rotated relatively to each other, and wherein a diameter of the rotor pin is equal to or greater than one tenth of an inner diameter of the bearing hole and is equal to and smaller than half of the inner diameter thereof.

12. The cycloidal reducer of claim 9, wherein the recess portion has a circumferential length that is smaller than a circumferential length of a semicircle having the first radius of curvature, wherein the inner pin of the housing is formed in the shape of a circle in such a manner that an outer circumferential surface thereof has a fourth radius of curvature that is the same as the first radius of curvature or is smaller than the first radius of curvature, and wherein a plurality of inner pin fixation grooves within which the plurality of inner pins, respectively, are fixed, are formed in an inner circumferential surface of the housing, and each of the plurality of inner pin fixation grooves has a circumferential length that is greater than or the same as a circumferential length of a semicircle having the fourth radius of curvature.

13. The cycloidal reducer of claim 9, wherein the recess portion to be engaged with the inner pin is formed at a position where, when the recess portion is engaged with the inner pin, the center of the recess portion is spaced a distance away from the center of the cycloidal rotor with the center of the inner pin in between.

14. The cycloidal reducer of claim 9, wherein the protrusion portion comprises:

a central protrusion portion formed on the center of the protrusion portion and having a second radius of curvature; and a lateral-surface protrusion portion formed symmetrically about the central protrusion portion and having a third radius of curvature different from the second radius of curvature.

15. The cycloidal reducer of claim 9, wherein the output unit comprises:

a first annular plate in the shape of a ring that has a preset inner diameter;

a second annular plate in the shape of a ring that is formed in such a manner as to be concentric with the first annular plate and has an outer diameter different from the inner diameter; and a bearing to the side of the output unit that is arranged between the first annular plate and the second annular plate and is rotated in such a manner that the first annular plate and the second annular plate are moved relatively to each other;

wherein the first annular plate is formed in such a manner that an outer diameter thereof is smaller than an inner diameter of the housing, and the output unit is inserted into an inner circumferential surface of the housing, wherein a plurality of rotor pin accommodation portions are formed in a lateral surface of the second annular plate in such a manner as to be equally spaced, in a circumferential direction of the second annular plate, and wherein first end portions of the plurality of rotor pins are coupled to the rotor pin accommodation portions, respectively, in a manner that is impossible to rotate.

16. The cycloidal reducer of claim 15, wherein the reduction unit further comprises:

a rotor-to-output-unit connection member including a separation annular plate that has a separation rotor pin accommodation portion on one surface thereof which is formed at a position corresponding to the rotor pin and into which the rotor pin is inserted, and a separation protrusion portion formed on the center of the other surface of the separation annular plate in a manner that protrudes therefrom, and coupled to the output unit, and wherein the rotor-to-output-unit connection member is fastened to at least one of the first annular plate and the second annular plate.

17. The cycloidal reducer of claim 9, wherein the output unit comprises:

a first output unit coupled to one surface of the cycloidal rotor and configured to accommodate first end portions of the plurality of rotor pins; and a second output unit coupled to the other surface of the cycloidal rotor and configured to accommodate second end portions of the plurality of rotor pins that are formed in a direction opposite to the first end portions thereof, wherein the first output unit comprises:

a first annular plate in the shape of a ring that has a preset inner diameter;

a second annular plate in the shape of a ring that is formed in such a manner as to be concentric with the first annular plate and has an outer diameter different from the inner diameter; and a bearing to the side of the first output unit that is arranged between the first annular plate and the second annular plate and is rotated in such a manner that the first annular plate and the second annular plate are moved relatively to each other, and wherein the second output unit comprises:

a third annular plate in the shape of a ring that has a preset inner diameter;

a fourth annular plate in the shape of a ring that is formed in such a manner as to be concentric with the third annular plate and has an outer diameter different from the inner diameter; and a bearing to the side of the second output unit that is arranged between the third annular plate and the fourth annular plate and is rotated in such a manner that the third annular plate and the fourth annular plate are moved relatively to each other.

* * * * *